United States Patent [19]
Nelson et al.

[11] 3,922,517
[45] Nov. 25, 1975

[54] WELDING METHOD AND APPARATUS

[75] Inventors: Jerome W. Nelson; Earl B. Nay; Eric W. Wittman, all of Houston, Tex.; Robert E. Pollock, deceased, late of Katy, Tex., by Peggy Pollock, executrix

[73] Assignee: CRC-Crose International, Inc., Houston, Tex.

[22] Filed: June 25, 1973

[21] Appl. No.: 373,483

[30] Foreign Application Priority Data
June 29, 1972 United Kingdom............ 30609/72

[52] U.S. Cl................................ 219/61; 219/137
[51] Int. Cl.................................... B23k 31/06
[58] Field of Search .......... 219/60 A, 61, 137, 122, 219/124, 125 R, 104–106

[56] References Cited
UNITED STATES PATENTS

| 3,088,018 | 4/1963 | Ross et al. | 219/60 A |
|---|---|---|---|
| 3,268,707 | 8/1966 | Thomas | 219/60 A X |
| 3,461,264 | 8/1969 | Nelson et al. | 219/60 A |
| 3,668,360 | 6/1972 | Ballis | 219/61 |
| 3,718,798 | 2/1973 | Randolph | 219/60 A |
| 3,727,025 | 4/1973 | Dibenedetto | 219/60 A X |
| 3,737,614 | 6/1973 | Paulange | 219/60 A |
| 3,748,426 | 7/1973 | Stanley | 219/60 A |
| 3,748,433 | 7/1973 | Gwin et al. | 219/60 A X |

Primary Examiner—C. L. Albritton

[57] ABSTRACT

A welding method for forming girth joints between ends of pipe from the outside in pipelines or in analogous work members by a combination of welding variables including forming a special joint cross section having a small internal V-gap or notch. This gap adjoins a plane annular surface where the pipe ends abut; outside of the abutting area an external gap gives access to the welding instrument. The wire electrode is fed under precision speed and directional control and at an abnormally steep leading angle at least at the 0° and 180° (top and bottom) positions. At different points around the joint, this angle of the weld electrode can be varied to stabilize penetration. Gas flow is controlled to help offset gravitational effects on the molten metal at the arc. At the inside corners the metal of the work members is upset, as by cold rolling or swaging, to form on each side of the inner gap a low taper and a small projecting rib or feather edge to assist further in stabilizing penetration of the weld into the gap. A backing member may be placed inside the joint to stabilize the inner bead by chilling. A contact tube lifting apparatus is disclosed for variably spacing the welding head at different places around the joint. Special means for upsetting the internal wall corner to produce the internal taper and projection also are disclosed.

20 Claims, 22 Drawing Figures

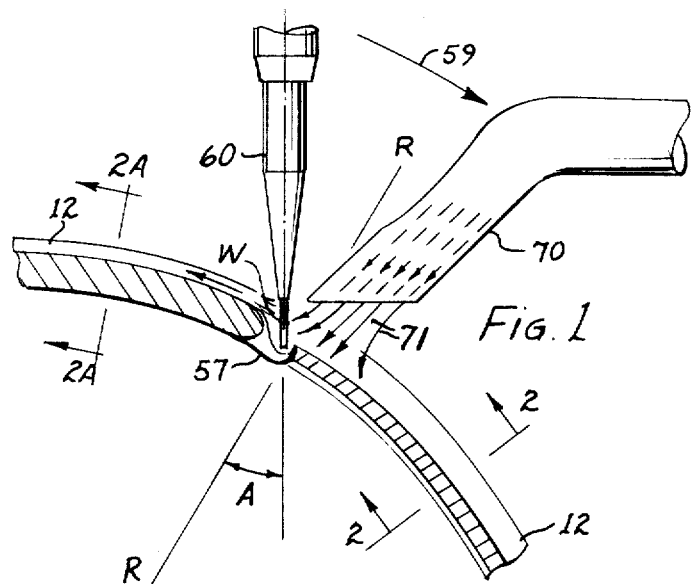
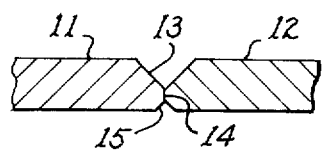
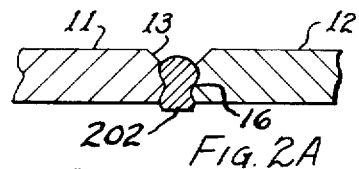
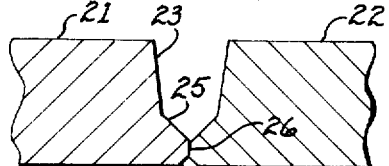
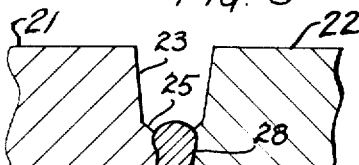
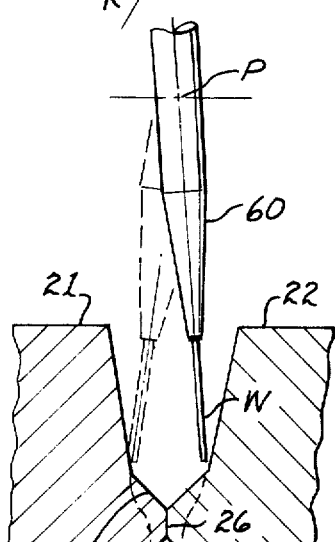
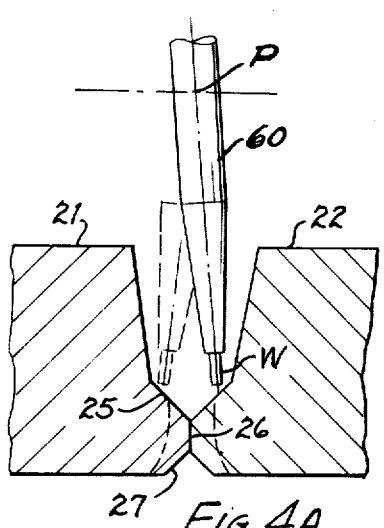
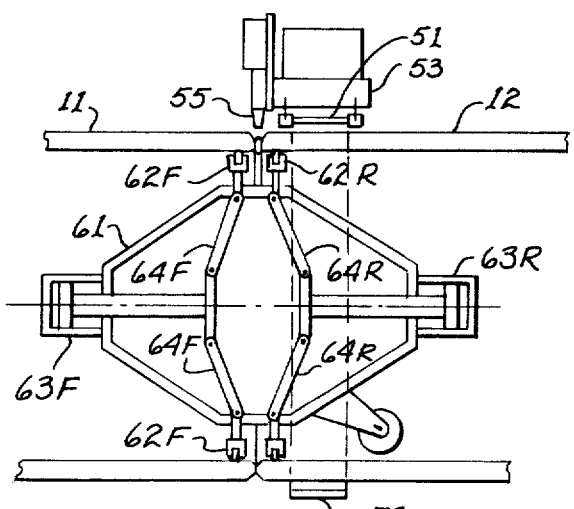
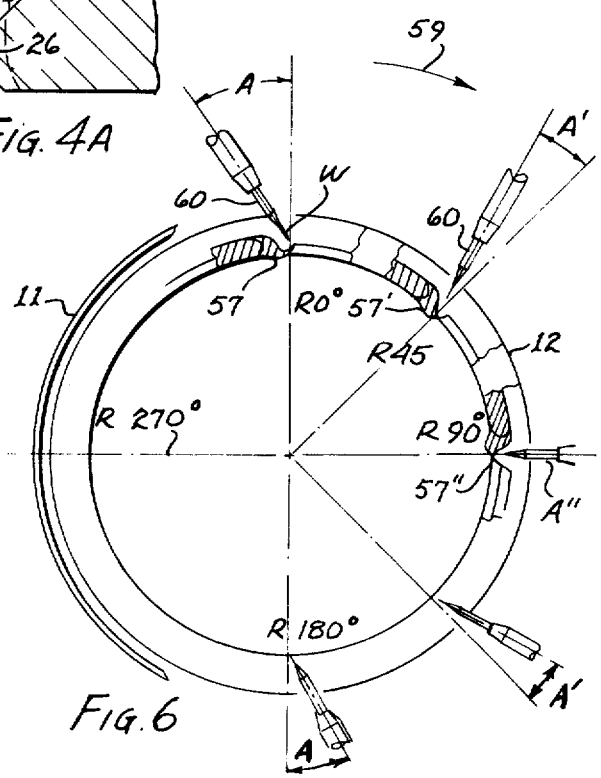

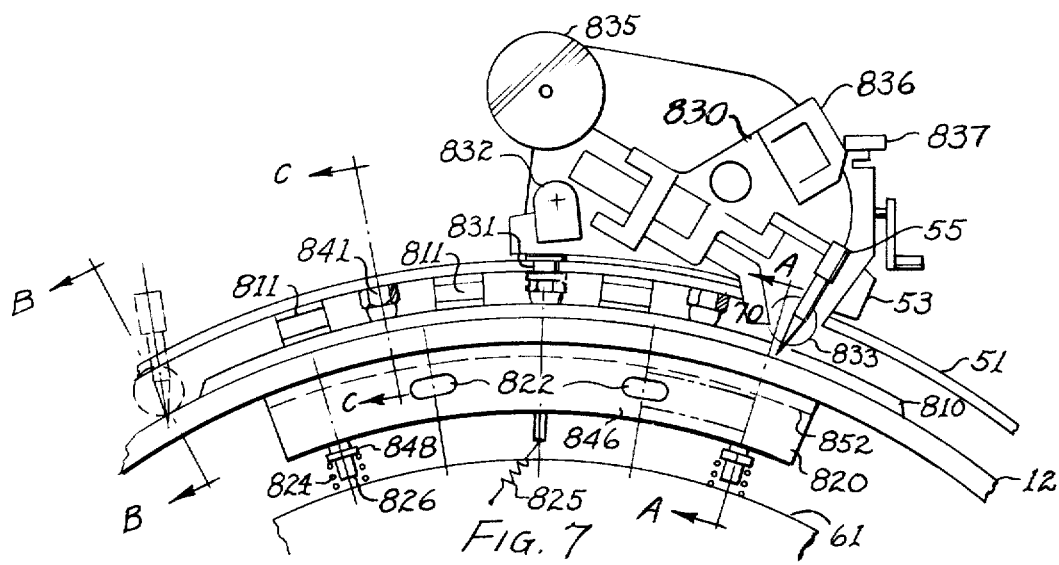
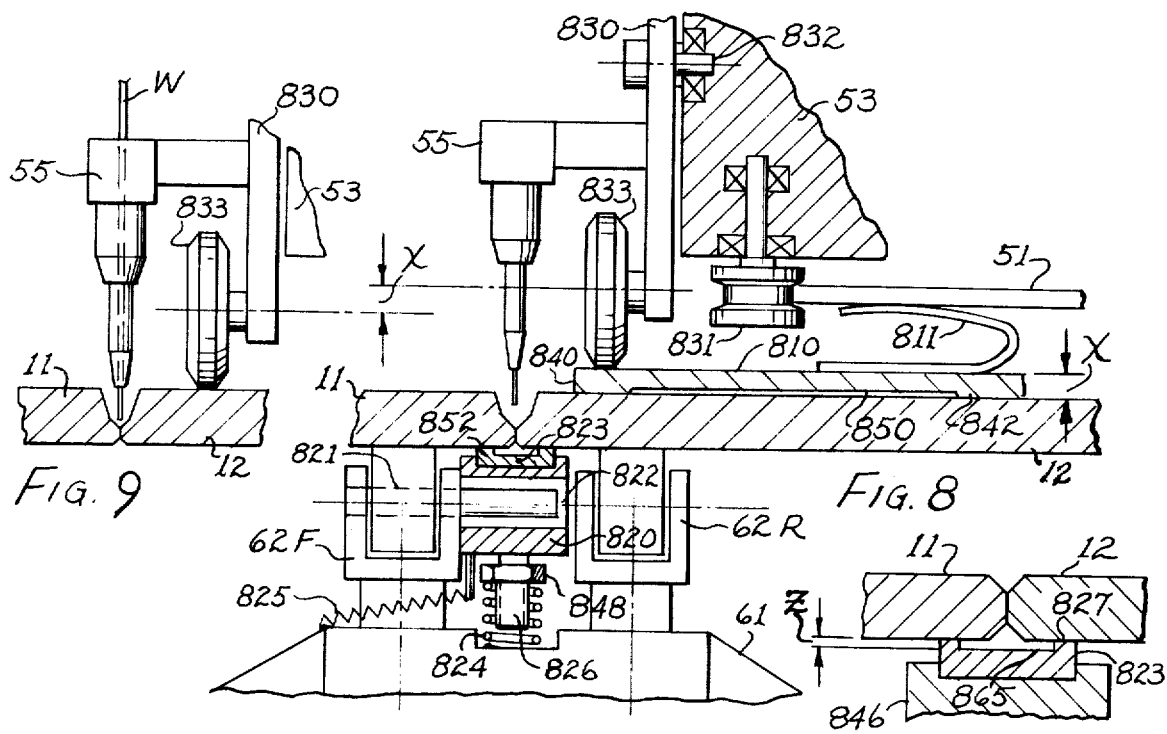
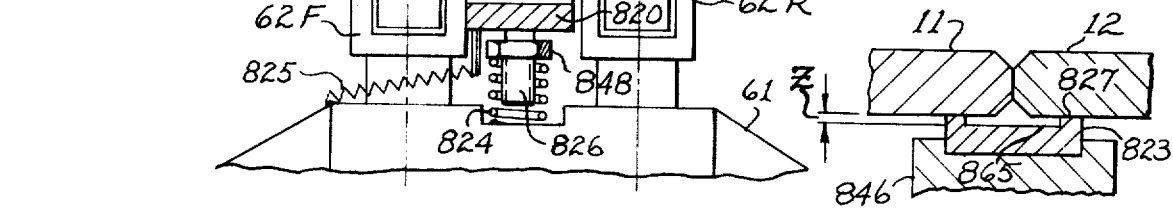
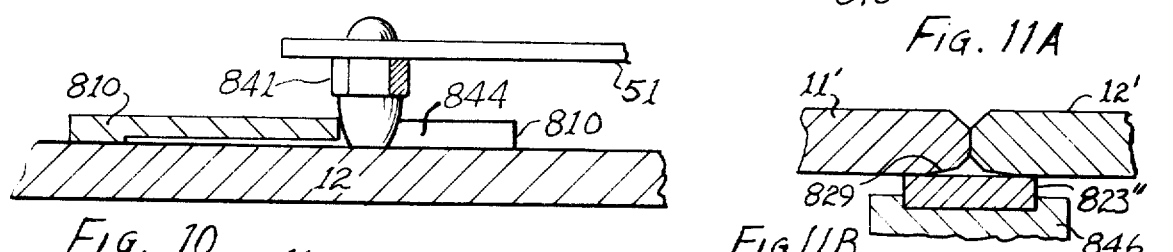
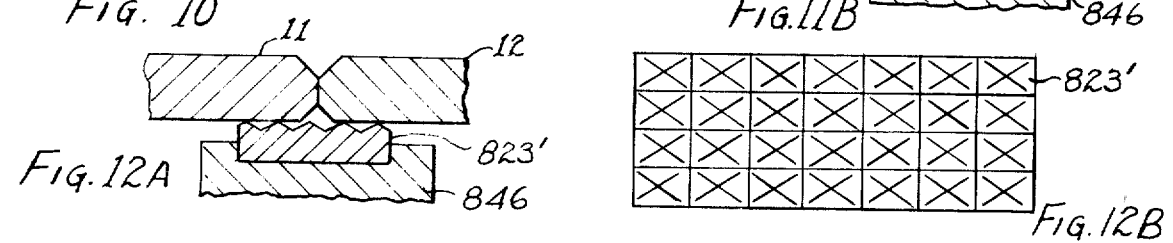
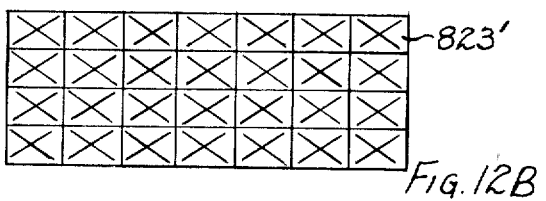

WELDING METHOD AND APPARATUS

BACKGROUND AND PRIOR ART

Many efforts have been made in the past to weld the girth joints in pipelines by automatic machinery, using a traveling electric arc. Most of these efforts have not been successful because of the difficulty of controlling various critical factors such as width of gap to be filled, irregularities in wall thickness, arc travel speed, voltage or current, the spacing of the electrode from the work (so-called CTWD, contact tube to work distance) and others. One process which has been quite successful uses an internal clamp which includes precision self-aligning means and an orbiting welder head which must be very carefully guided as it traverses the inner circumference of the pipe to form the first or "stringer" bead internally. This method and apparatus, and various components thereof are described and claimed in U.S. patents to Nelson and Sims, U.S. Pat. Nos. 3,461,264, and 3,561,320, a patent to Nelson and Randolph U.S. Pat. No. 3,632,959, and others. The pipe ends must be carefully shaped in the field for this type of welding; means for accomplishing this are set forth in U.S. patents to Paysinger, Sims and Nelson, U.S. Pat. Nos. 3,608,406 and 3,733,939.

The procedure just described must be supplemented, in nearly all cases, by further welding steps performed from the outside of the joint by orbiting welder means which are supported and guided with precision around the joint to fill in the gap and cap the weld. Equipment and procedures for accomplishing the latter are described and claimed in Miller and Nelson U.S. Pat. No. 3,604,612, relating to guide track and carriage equipment, and the preferred welding means are described per se in Randolph et al. U.S. Pat. No. 3,718,798, in an application of Nelson, Pollock and Randolph, Ser. No. 254,192, filed May 17, 1972, now U.S. Pat. No. 3,806,694 and in other applications and patents.

Experience has shown that certain joint designs or cross sections facilitate welding by automatic means and that such are best formed in the field immediately prior to the welding operations. The apparatus and process described in the Paysinger et al. patents mentioned above is found to be very useful for shaping the pipe ends with precision in the field to meet the particular needs of automatic welding.

The joint design may be such as is shown in Nelson and Sims U.S. Pat. No. 3,461,264, mentioned above, or some variation thereof. Preferably, it includes a small bevel on each pipe end at the inside to form a small V-gap inside when the two pipes are brought together. Outside of the V-gap is a plane annular perpendicular area at which the two members are brought into abutment or near abutment and outside of the latter an external gap or kerf is provided. The perpendicular or vertical "land" surfaces are parallel to or in the weld plane. Final placement of the molten pool in the weld depends on the amount of heat applied and on the heat capacity of the metal in the work. Control of penetration by various means described below is a major object of the invention.

It is desirable in some cases to be able to make all the necessary welding passes from the outside of the pipe. This has not been accomplished commercially in the prior art, so far as applicants are aware. Control of penetration is a major problem in attempting to form the inner or first pass from the outside. A major object of the present invention is to better control this penetration by a combination of factors, including use of a joint which facilitates such control. The factors or steps required are set forth below.

It has been suggested in the prior art that weld penetration to the inside surface of work members, such as pipes, can be controlled in some cases by using a back-up or "chill" member inside the joint while welding from the outside by use of an electric arc. Such a chill or back-up member usually is made of copper or analogous heat conductive metal that will quickly cool off the molten metal from the arc as it contacts the back-up; however, one problem is that the back-up itself is often damaged by the intense heat of the electric arc. This can result in rapid destruction of the back-up member and, also, in contamination of the weld by the copper or other undesirable ingredients thus released. Such contamination cannot be tolerated where welding specifications are strict, as they must be in pipeline construction. An object of the present invention is to reduce or eliminate damage to the back-up members as well as contamination, to make possible the use of simpler and less expensive back-ups when they are required and to produce high quality internal welds from the outside.

Another feature of the present invention is the discovery that penetration control can further be facilitated by a minor swaging or cold working of the metal of the work member to form a minor taper or bevel inside at the edge of the usual internal V-gap, forming also a small projecting ridge or feather edge in the V-gap, preferably on each side of said gap. Another feature involves modification of known and preparation means for forming these projections. With minor modifications, the apparatus described and claimed in the Paysinger, Sims and Nelson patents, mentioned above can be used for this purpose at the time or immediately after the pipe ends are being prepared, as mentioned above. Although the projections so formed are small and involve inconsequential amounts of metal of the pipe ends, they are found to be highly effective for stabilizing penetration. Of course, where preferred, the swaging or cold working can be accomplished in other ways.

Another aspect of the invention is the use of ramp means to control weld-head angle, especially at critical points of the joint circumference. Still another is the use of back-up or chill members in a novel manner. The invention includes the use of any one, or any combination of, the developments disclosed in the various sections hereof.

BRIEF DESCRIPTION OF DRAWINGS

FIG. 1 is a cross-sectional view of a portion of the end of one cylindrical object being welded to another.

FIG. 2 is a view along the line 2—2 of FIG. 1.

FIG. 2A is a view along the line 2A—2A of FIG. 1, showing the root band.

FIG. 3 is a modification of the joint of FIG. 2 used with thicker-walled material.

FIG. 3A is a view similar to FIG. 3 after the root bead has been laid.

FIG. 4 is a view of the wall of two ends of pipe being welded together with an oscillating welding tip in a raised position.

FIG. 4A is a view similar to FIG. 4, but with the welding tip in a lowered position.

FIG. 5 is a longitudinal section of two abutting pipes being held in position by an internal clamp for welding.

FIG. 6 is a cross-sectional view of a pipe joint being welded and illustrating a change of lead angles between the wire electrode and the radius of the pipe.

FIG. 7 is a cross-sectional view of the top portion of a pipe joint being welded with an automatic welding machine illustrating, among other things, a programming ramp and a back-up assembly.

FIG. 8 is a view along the line A—A of FIG. 7.

FIG. 9 is a view along the line B—B of FIG. 7.

FIG. 10 is a view along the line C—C of FIG. 7.

FIG. 11A is a cross-sectional view of a joint with a spacing back-up.

FIG. 11B is a cross-sectional view of a joint formed by the arrangement shown in FIGS. 14A and 14B using a flat back-up.

FIG. 12A is a cross-sectional view of a joint with a waffle-patterned back-up.

FIG. 12B is a plan view of the back-up of FIG. 12A.

Figure 13:
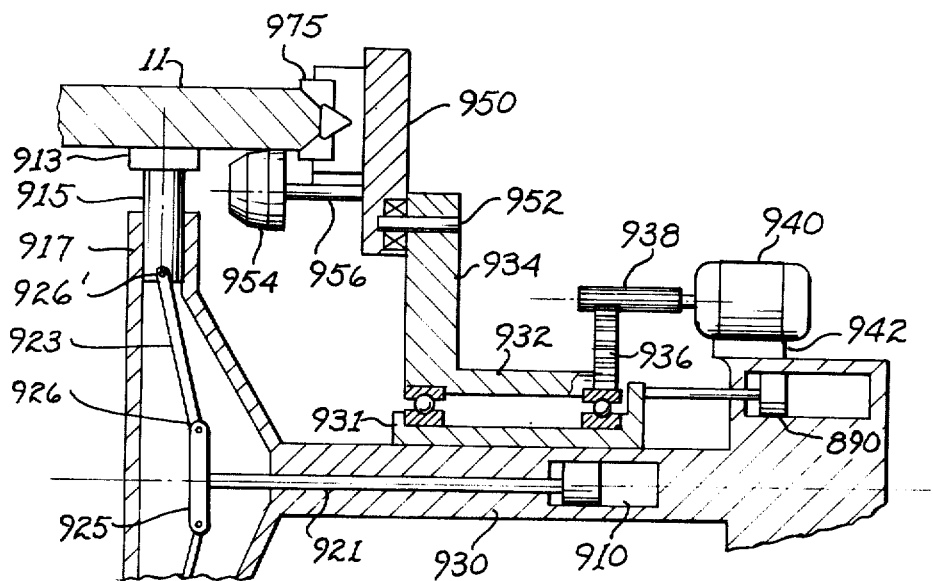
FIG. 13 is a vertical sectional view illustrating the preparation for welding of an end of a cylindrical object.

Referring to the drawings, pipes or cylindrical objects 11 and 12 (FIGS. 1 and 2) are machined or shaped on their adjoining end surfaces to provide an outer bevel 13, a perpendicular contacting land area 14, and an inner bevel 15 to develop the configuration of the joint there illustrated. It is desired to form an inner bead or stringer bead 16 illustrated in cross-section in FIG. 2A, from outside the pipe. A smooth endless track 51 (See FIGS. 5 and 7) is tensioned around one of the pipes, such as 12, to support and guide a traveling carriage 53, which carries a welding head assembly 55. The details of this track and carriage assembly are not the present invention, but are explained in U.S. Pat. No. 3,604,612, with certain further refinements described in a U.S. patent application of Nelson, Randolph and Pollock, filed May 17, 1972.

As described in said patent, the welding head 55 is traversed around the pipe in orbital fashion under highly accurate control which keeps the welder precisely in the plane of the weld joint, FIG. 5. FIG. 5 shows also an internal clamp 61 having front and rear sets of clamping shoes 62F and 62R operated by air pressure cylinders 63F and 63R through toggle linkage 64F and 64R. With the normal operating parts just explained, the clamp holds pipes 11 and 12 in concentric alignment with land areas 14 or 26 (FIG. 3) in tight abutment.

However, sometimes space does occur between parts of the ends of the pipes 11 and 12, which affects weld penetration. Also, depending upon pipe and wire chemistry and welding position, fluidity of the molten welding pool will vary and even with proper penetration the bead can "suck back" toward the welding arc resulting in an undesirable concave root bead contour. This concavity is difficult to control in the overlap areas, near the vertical welding positions (the 90° and 270° positions illustrated in FIG. 6) and at points where a weld is completed.

This invention includes procedures to control the bead and its formation.

Referring now to FIGS. 7 and 8, there is illustrated in more detail than in FIG. 5 the construction of a traveling carriage (which is described more fully in U.S. Pat. No. 3,604,612 with certain refinements described in the aforesaid United States patent application), together with the addition of an angle-programming ramp 810 and a welding back-up assembly 820. The ramp will be described in more detail below.

JOINT AND BACK-UP DESIGN

FIGS. 2 and 2A show a joint design for thin material. The initial stringer bead 16 is formed by the arc penetrating into the land area 14 with the molten metal combined with arc and gas pressure as previously discussed, forming a meniscus as the arc passes along the joint so that the weld (unless otherwise controlled) would be of uncertain form, flush, convex or concave with respect to the inner surfaces of the pipes 11 and 12, when the bead cools and solidifies, depending upon the welding position and condition. By using the welding back-up, the liquid meniscus contacts it and solidifies to conform with the surface of the welding back-up and therefore the contour of the inner surface of the weld bead is not left to chance. This joint design, beveled from both sides to relatively narrow elements, acts as a heat trap, insuring molten temperatures and fusion between the two joint ends in contact with each other, with the molten metal flowing heat into the body of the work pieces helping to keep the liquid pool a fairly viscous mass that does not flow too freely.

The pipe ends are prepared or the joints are buffed to a bright metal finish just before welding. The inside bevel 15, FIG. 2, with its freshly prepared or buffed surface, as compared to a normally milled-scaled and sometimes coated inside surface, is an asset of the joint design. As the superheated area under the arc melts and pressure is applied to the pool, the bright unoxidized inside bevel helps insure wetting to and beyond the bevel extremities with a bead at least as wide as the inside vee formed by the bevels. Even in cases of joint offset called "high-low", the inside bevel helps by its melting and wetting action.

FIGS. 3 and 3A show a somewhat more complex joint design for thicker wall pipe in which a similar result is achieved. Here the two adjoining pipe elements 21 and 22 have formed between them a rather complex contour which includes an upper or outer gap bevel 23 which is very steep and a mid bevel 25 which is less steep and similar to bevel 13 of FIG. 2, terminating in the vertical or substantially plane-ended land portion 26, and a narrow inside bevel 27 forming a lower joint contour similar to land portion 14 and inside bevel 15 of FIG. 2. A weld applied from the outside as described in FIGS. 2 and 2A fuses through the mid bevel and contacting narrow land areas 26 and forms a bead 28 which is completely fused into the inner body of the pipe ends and is nearly flush at its inner surface 204 with the inside wall of the pipe.

The inside bevel has additional important functions. If weld penetration is not obtained, a very sharp and unmistakeable line appears on the X-ray film of the weld. This is quite important when the root or initial pass is made from the outside. Additionally, if only partial penetration occurs and the weld pool does not fill the inside bevel, a marginal but still acceptable weld still results with respect to strength because of the elimination of a crack-like defect by the inside bevel. This would not be true if the bevel were absent.

The purpose of the back-up assembly is to control position of and/or to rapidly solidify the molten weld pool at the surface opposite the welding head.

The back-up assembly 820 includes, in general, an arcuate shaped body 846, FIG. 7, having in its upper or outer surface a channel 852, FIG. 8, containing a weld backing or chilling insert 823. The insert 823 is adapted to press against the inside surfaces of the pipes 11 and 12 at the joint backing body 846 and is adjustably affixed to clamp 61 through front shoes 62F. The back-up body 846 has transverse slots 822 which loosely receive pins 821 projecting axially of the pipe from shoes 62F. A tension spring 825 holds the back-up body 846 forward (to the left, FIG. 8) and in sliding contact with the rear of shoes 62F. Secured to the lower or inner surface of the back-up body 846 are a pair of studs 826 each having an adjustable nut 848 which is loaded with a spring 824 acting between the nut 848 and the clamp 61 to urge the back-up insert 823 against the interior surface of the pipes 11 and 12.

Referring now to FIG. 11A, there is illustrated in larger detail a weld backing insert 823 which, as shown here, has a channel 865 with outer flanges 852 having pipe contacting edges 827 to space the channel 865 of the weld backing insert 823 a short distance Z from the inner surface of the welded joint. Typically, this spacing of the channel 865 from the inner surfaces of the pipes 11 and 12 is approximately 0.015 to 0.020 inches. The weld backing insert 823 is made of copper or any other good heat sink material. This combination of the space Z and the heat sink material of the weld backing insert 823 allows the root bead of the weld to penetrate within the inner surfaces of the pipes 11 and 12 while holding it in position for quick solidification against the weld backing insert 823.

Referring now to FIG. 12A, there is illustrated a modification 823' of the weld backing insert. In FIG. 12A, the spacing of the chilling surface of the weld backing unit from the inner surface of the pipes 11 and 12 is obtained by the waffle configuration of the upper or outer surface of the weld backing insert 823', also illustrated in FIG. 12B.

The weld backing insert 823 of FIG. 11A is more sensitive in its effect on a proper weld if it should be improperly horizontally aligned than is the weld backing insert 823' of FIG. 12A. Similarly, the weld backing insert 823 of FIG. 11A is more likely to be adversely affected by dirt between the inner surfaces of the pipes 11 and 12 and the lips 827 than is the effect of dirt between the insert 823' and the pipes 11 and 12 in FIG. 12A.

The arrangement of FIG. 11B is similar to the arrangement of FIG. 11A except that the weld backing insert 823" of FIG. 11B is rectangular in cross-section and does not have the channel 865 of FIG. 11A. That channel is not necessary in the arrangement shown in FIG. 11B because at the joint between the pipes 11' and 12' there has been formed on the inner surface of each a shallow bevel 829 which allows the formation of a proper root bead. This is explained further below.

As will be discussed later herein with respect to head angle, for these back-ups to perform most satisfactorily, a welding condition must be used that will not arc or bond the weld pool to the back-up insert.

It has been helpful in some instances to coat the upper or outer surfaces of the welding back-up inserts with a powder of the type that is used to coat the interior of a mold to prevent metal castings from sticking to a mold when the castings are being made. If desired, and under certain conditions, it is practical to permanently bond a ceramic coating to the upper surface of the weld back-up inserts.

WELDING HEAD ANGLE

A radius R of an arcuate portion of a pipe 12 is shown in FIG. 1, welding taking place near the top or 0° position. See also FIG. 6. One aspect of the present invention is the stabilizing effect on the weld pool and penetration of the arc into the gap to be welded at and near the 0° position and also the 180° position by the use of a large leading angle A of the wire electrode W to the pipe radius at R. The relationship of the electrode W to the molten pool 57 and radius R is shown, it being understood that in FIGS. 1 and 6 the pipe is being welded left to right, and in so doing the welding apparatus is travelling clockwise as shown by arrow 59. (When in the lefthand side of the end of the pipe as viewed in FIGS. 1 and 6 is being welded, the welding apparatus will travel in a counterclockwise direction from the 0° to the 180° position.)

As stated above, the electrode wire W projecting through the tip or contact tube 60 makes the leading angle A with respect to the radius R. This angle is preferably between 15° and 45° with 30° being considered the optimum when the angle is fixed during the entire welding of a joint while welding at relatively high speeds (approximately 45 to 75 inches per minute) and using the programming ramp 810, discussed below. Similar results can be achieved with a variable head angle as shown in FIG. 6.

As the welding head moves clockwise from the top of FIG. 1, the force of gravity tends to pull the molten pool 57 downwardly and closer to the wire W. As this pool crowds or floods closer, the wire W burns off near the end of tip 60. This decreases penetration, the maximum effect of the decreased penetration being realized when welding at the 90° and 270° positions, FIG. 6; hence the head angle is reduced to compensate. With the wire W at a large leading angle, penetration stability is obtained at 0° and 180° positions because of the effect of the length of the extended arc burning off the wire W sooner. Also, the desired bead contour results through the flat (0°) and overhead (180°) positions because the heat and arc pressure along the welding pool are extended because of the steeper angle.

If desired, the programming ramp 810 of FIG. 8, described more fully below, can be omitted and the lead angle can be changed during welding as shown in FIG. 6 at $R_0$, $R_{45}$ and $R_{90}$, etc., returning to a steep angle at 180°', but normally this varying of the lead angle will require programmed mechanical manipulation of the head as described for a different type of operation in the Nelson U.S. Pat. No. 3,551,636 issued Dec. 29, 1970.

This use of the large leading angle A of the electrode wire W with its stabilizing effect upon the weld pool and control of penetration of the weld arc helps to prevent destruction of the weld back-up insert and contamination of the weld which ordinarily accompanies such destruction.

SHIELDING GAS

Also, in order to assist this holding action of the weld pool, a nozzle 70 (FIG. 1) for supplying inert gas around the weld is placed with its outlet close to the surface of the pipe 12, and is so arranged that the gas emerges at a fairly high velocity in the direction of arrows 71. That is, it flows into the weld and along the groove against the metal pool 57. This exerts a further retarding action on the metal pool 57, holding it back against flowing into contact with the wire W, increasing penetration, and exerting a force towards the pipe axis during solidification, helping to improve the inside bead contour as illustrated at 202 and 204 in FIGS. 2A and 3A respectively.

JOINT PREPARATION

Figure 14A:
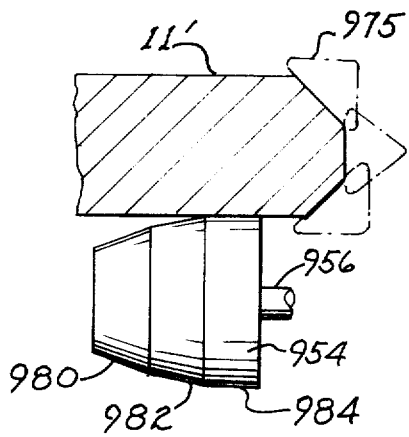
FIG. 14A is a sectional view of a portion of one end of a cylindrical object being shaped by cutters positioned by a roller riding the inside surface of the cylindrical object.
Figure 14B:
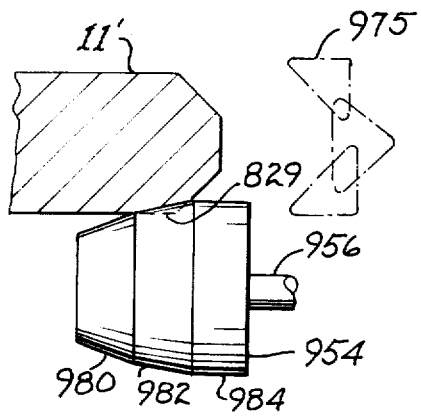
FIG. 14B is similar to FIG. 14A, except the roller is partially withdrawn from the end of the cylindrical object to a position for roll-forming a bevel on that object.

Referring now to FIGS. 13, 14A and 14B, there is shown a preferred means for forming the shallow inside bevel 829 of FIG. 11B. The structure and operation of the device of FIG. 13, except for the specifically shaped surface of roller 954 and its use to form the shallow inner bevel are fully described and illustrated in U.S. Pat. Nos. 3,608,406 and 3,733,939, issued Sept. 28, 1971 and May 22, 1973 to Joseph R. Paysinger, et al., to which reference is here made.

A pipe clamping machine is shown in part, as comprising a set of pipe wall engaging clamping shoes 913, FIG. 13, arranged in a clamp frame to extend around the axis of the pipe 11 so as to grip its interior surface when moved radially outward. Each shoe 913 is supported on a radially-extensible rod 915 which is guided through ring members 917. The rod 915 may be moved out to clamping position or drawn into release position by means of cams, toggles, etc. For example, a toggle means, including a longitudinally movable central shaft 921, is shown which operates to move toggle rods or bars 923. These bars are connected at 926 to a central hub 925 fixed to shaft 921. Each toggle rod 923 is pivotally connected at its outer end 926' to radially slidable clamp rod 915, each of which carries a clamp shoe 913. When shaft 921 is moved to the left, the clamp shoes are tightened. When the shaft 921 is retracted toward the right, the clamp shoes are released from clamping position. Rod 921 may be operated by any suitable means, such as by piston and cylinder arrangement 910.

The principal support element for the end-forming mechanism comprises a main and non-rotatable hollow shaft 930. On this shaft is slideably mounted a non-rotating sleeve 931. The latter supports for rotation a rotatable cylinder 932. Cylinder 932 is attached to a face plate 934. A gear 936 is also formed integrally with the cylinder 932 which gear is designed to be driven in rotation around the sleeve 931 and the shaft 930 by elongated spur gear 938 of an electric motor 940. This motor is supported by a fixed element 942 on the main clamp frame.

The cylinder 932 rotates on the sleeve 931 and the sleeve 931 is secured against rotation with respect to the shaft 930, it being understood that the sleeve 931 and the cylinder 932 can slide along the shaft 930. Mounted on the left side of face plate 934 are a plurality, preferably three, of arms 950 each pivotally supported on a pin 952 secured to the face plate. These pivotally-mounted arms each can rock about the pivot pins 952 which constitute their support. Each arm 950 carries cutters 975 and a cutter guiding and forming roller 954. Roller 954 is shown in more detail in FIGS. 14A and 14B.

These rollers 954 are freely rotatable on their shafts 956 and are adapted to fit inside and roll around the inner surface of a pipe 11, 11' the end surface of which is to be machined to the desired shape or profile.

Each arm 950 is strongly spring loaded in such a way that the rollers 954 are normally urged radially outward away from the central hollow shaft 930. The main purpose of these arms 950 is to carry the cutting elements and the forming rollers to create the desired shape on the pipe end. The purpose of rollers 954 is to assure that the surface will be accurately machined all around the annular pipe end in a predetermined relationship to the inner periphery of the pipe and, additionally, according to the present invention, on partial withdrawal from the pipe, to form the inner shallow bevel 829 best illustrated in FIGS. 14B and 11B, rollers 954 being specially shaped for this purpose, as explained below.

Figure 15:
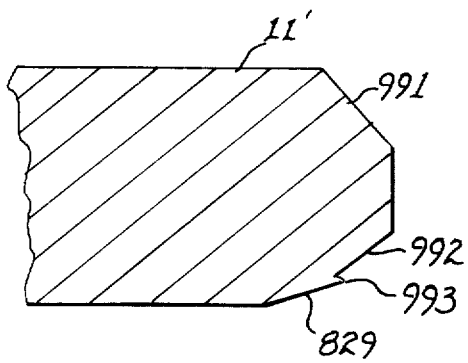
FIG. 15 is a cross-sectional view, enlarged, through a pipe wall prepared as in FIGS. 13, 14A and 14B.

As rollers 954 move around inside of the pipe, the machine or cutting elements 975 cut the desired contour on the end of the pipe, as illustrated in FIG. 14A. When the desired end contour has been cut, except for the shallow inner bevel 829, the cutters and the arms 950 supporting them are withdrawn from operating position by a pair of hydraulic cylinders 890, only one of which is shown. Main bevel cuts 991, 992 are shown in FIG. 15, also a small ridge or spur element 993 is formed from the cold rolling by surface 982 of roller 954.

Each roller has three beveled surfaces, 980, 982, and 984. The bevel surface 980 is used to guide the roller 954 into position within the pipe 11. The intermediate bevel portion 982, which is of hardened metal, is the portion of the roller 954 used to form the shallow inner bevel 829 by cold rolling action upon partial withdrawal of the rollers 954.

To summarize, as the apparatus is to be used, the clamping structure is placed within the pipe 11 which is to be machined on its end surface. After the clamp has been inserted a suitable distance, the clamp shoes 913 are operated to expand them into tight clamping position. Thereafter, the hydraulic pistons 890 are operated to push the sleeve 931 and the cylinder 932 to the left. This forces the rollers 954 to move inside the pipe, swinging the arms 950 radially inward by the action of the end of the pipe 11 upon the bevel surfaces 980 and 982 of rollers 954. The cylinder or sleeve 932, FIG. 13, is then rotated by motor 940 to machine the end surfaces, the cutter elements 975, of course, being shaped and pre-ground to cut the desired profile.

After the desired profile, FIG. 14A is cut, the pistons 890 are actuated to retract rollers 954 from the position shown in FIG. 14A to the position shown in FIG. 14B. When the rollers 954 are in position as shown in FIG. 14B, the bevel surface 982 on each of them will bear against the internal end of pipe 11, because of the spring loading, and form the shallow bevel 829. Thereafter, the piston 890 is actuated further to withdraw the cutting elements and rollers from the end of pipe 11. The spring loading required for cold rolling the bevel surface 829 may be heavier, if required, than the described in the aforesaid patents.

Figure 16:
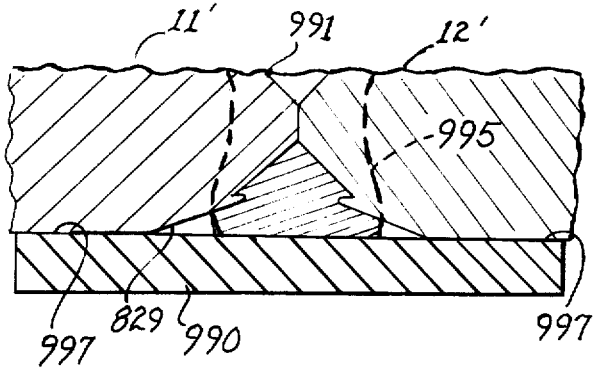
FIG. 16 is a sectional view through part of a welded joint, between parts as in FIG. 15, using a back-up or penetration control member.

As shown in FIG. 16, when an inner bead weld is produced from the outside of a pipe joint, the adjoining pipe ends having been beveled at 991 and 992, with the cold rolled taper 829 as described above, minor fins or projecting edges 993 are produced. These serve to hold the meniscus of molten metal and to control the contour of the bead inside the pipe. These fins or edges 993 serve as minor heat sinks to further control metal flow into the inner V-gap. The welded area 995 thus is solidified in the desired form. In FIG. 16 a flush back-up member 990, which bears at its edges 997 against the inner pipe walls. In case the molten metal comes through far enough, its protrusion will be limited as it congeals against the chill or back-up 990.

WELDING ARC MODE

When using an intermittent arc one disadvantage of this short circuiting mode in fine wire welding for the root pass when welding with a standard spaced bevel is that often unmelted wires, called "cat whiskers", are pushed through the weld and protrude several inches into the interior of the pipe. Later these whiskers will break off and damage pumping equipment and the like. This welding mode as used in combination with the abutted joint designs described herein, with steep head angle and other controls, permits the use of fine wire welding free of cat whiskers over wide ranges of joint fit up.

CONTACT-TUBE-TO-WORK DISTANCE AND OSCILLATION WIDTH

It is known in the art that increasing the contact-tube-to-work distance (CTWD) decreases weld penetration, and decreasing the CTWD increases weld penetration. It is also known that with the use of an oscillating wire electrode for a given set of conditions, the penetration is less when the oscillation is greater in linear movement. In the present development, these two phenomena are used in combination with each other and in combination with the joint designs described herein to achieve superior results.

Referring now to FIG. 4, this illustrates the joint of FIG. 3 together with a welding tip 60 in a raised position oscillating from pivot point P and with a maximum CTWD. FIG. 4A illustrates the welding tip 60 in a lowered position with a minimum CTWD.

The arrangement of FIG. 4 gives the minimum welding penetration, while the arrangement of FIG. 4A gives the maximum. By reducing the CTWD with the joint design illustrated in FIGS. 4 and 4A, the normal amount of penetration will be increased by a combination of the decreased linear lateral movement (i.e., across the joint gap) of the wire electrode W, with a given angle of oscillation, and the closer relationship of the lower end of the wire W to the mid bevel 25. The "stick-out" of electrode W, FIG. 4A, is less than in FIG. 4, hence its amplitude of motion is less.

When a change of CTWD is used, the arrangement of FIG. 4 illustrates the equipment and joint relationship where less penetration is desired, such as in the 0° and 180° positions, while the arrangement of 4A illustrates the relationship where more penetration is desired as at the 90° and 270° positions.

PROGRAMMING RAMP

Referring now to FIG. 8, there is illustrated in more detail than in FIG. 5 a travelling carriage, as in U.S. Pat. No. 3,604,612 with certain refinements further described in the U.S. patent application mentioned above, together with the additional structure of a programming ramp 810 and a back-up assembly 820.

The purpose of programming ramp 810 is to program a change of contact-tube-to-work distance (CTWD) as the welder moves around the joint, although such changes may be made in other ways, as by rotating a control knob 837 on carriage 53, which will raise or lower the welding head 55 with respect to the joint.

The programming ramp 810 is a curved plate normally used at or near the 0° and sometimes at the 180° welding positions. It is placed in contact with the outer surface of the pipe 12 and under the endless track 51. The ramp 810 is held in position frictionally by a series of spaced U-shaped leaf springs 811 attached to plate 810 (see FIGS. 7 and 8) inserted between track 51 and pipe 12, and has its undersurface recessed at 850 so that contact of the ramp 810 with the pipe 12 is made near the front and back edges 840 and 842, thereby reducing the possibility that foreign substances or other surface irregularities on the pipe 12 will cause a tilting of the ramp 810.

The ramps 810 are inserted in position by sliding them over the end of the pipe and under the endless track 51 until the ramp 810, at the left end of positioning slots 844, contacts the acorn nuts 841 on the band 51 (FIG. 10). The combination of these acorn nuts 841 in the positioning slots 844 and the leaf springs 811 hold the ramp 810 releasably in position. It can be easily removed by the operator by sliding its leaf springs 811 out from under the endless track 51.

In operation, the programming ramp is positioned as shown in FIG. 8 with the CTWD wheel 833, attached closely beside the welding nozzle, riding on the ramp 810. This wheel 833 supports one end of a carriage frame plate 830 and a pivot 832 supports the other end. This plate 830 in turn supports the welding head 55 near the CTWD wheel. Welding wire is fed from a spool 835 by drive rolls in a housing 836 and through the welding head 55. As the CTWD wheel 833 rolls along the ramp 810, it will, if no adjustments are made, maintain a constant direction between the contact tube and work. However, this distance is decreased when the CTWD wheel 833 rolls off the end of the ramp 810 onto the pipe surface as shown in FIG. 9. The amount and timing of CTWD decrease caused by the CTWD wheel moving along and from the ramp 810 to the surface of the pipe 12 can thus be programmed by changing the thickness and configuration of the ramp 810.

Set forth below is an example of the method of the present invention.

EXAMPLE

In this example, two pieces of 36 inch pipe having 0.37 inch thick walls and the end design of FIG. 3 were welded together. The vertical land area was 0.055 inch thick and began 0.040 inch from the inner surface of the pipe 11. The inside bevel had an angle from the vertical of 37½°, the mid bevel had an angle of 45°, and the upper bevel had a 7° angle from the plane of the joint. The distance from the top of the mid bevel to the inner wall of the pipe was 0.190 inch. A back-up was used having a copper weld backing or chill insert of the shape illustrated in FIG. 11A with a channel depth Z within the insert of 0.015 inch. The head angle was set at 30°, leading. A root bead, generally in the shape of the root bead 28 in FIG. 3A, was laid down at a rate of 60 inches per minute with wire of 0.035 inch diameter fed at 650 inches a minute; 100 percent $CO_2$ shielding gas was fed through a ½-inch diameter nozzle at the rate of 100 cubic feet per hour. The CTWD was 0.330 inch for 10 inches on each side of the 0° position with this CTWD being established through the use of a programming ramp having a thicknesss X. During the remainder of the weld, there was no programming ramp and the CTWD was 0.270 inch. Arc voltage was 23, the amperage averaged 200, and the wire oscillation was 0.10 inch at the tip with 7.5 oscillations per second.

After the root bead was laid, the weld was completed will fill and cap passes.

The operator in carrying out this example maintained good penetration and stability in all positions, making a root bead with good contour, a flat lower surface, and almost undetectable stop overlaps.

The present invention comprises a novel combination of a number of factors, or steps, most of them known individually in the prior art, which makes it possible to achieve a new result, namely, the formation of a sound and accurately formed inner pass or stringer bead from the outside of a pipeline or similar structure. The factors are as follows, listed more or less in order of importance, although relative importance may vary in different situations and some of them will not be essential in many cases:

a. A double vee joint design with a narrow abutting intermediate vertical land surface between on each pipe end.
b. Feeding fine electrode wire under precision control of speed and direction, at an abnormally steep angle.
c. Use of a back-up to stabilize the back of the inner head as it is formed.
d. Oscillation of the wire, and varying the amplitude of such amplification when required, to control penetration.
e. Close voltage control at the arc.
f. Position programming, i.e., of CTWD as by a ramp or cam mechanism to obtain optimum spacing at various circumferential positions.
g. Control of gas flow to stabilize the molten metal pool at the arc against the force of gravity.
h. Precision joint preparation in the field to obtain optimum fit and clean surfaces.
i. Use of intermittent arc.

Factors or steps (a) and (b) are considered to be essential in all cases; the use of a back-up is nearly always required but may be dispensed with under very favorable conditions. Oscillation of the wire helps considerably in pepetration control. The other steps or factors may be used or omitted by a skilled operator; in general their use provides additional assurance of high quality weld production. Normally, with joint high-low or gap opening variations experienced in the field, use of all the listed stability factors is preferable for maximum consistency of weld quality. However, some steps or factors may be omitted under more favorable conditions of fit-up, or by using additional operator skill to compensate for the factors omitted, or when lower quality can be tolerated. However, it will be obvious that various modifications may be made within the scope and spirit of the invention.

What is claimed is:

1. A process for forming a first welding pass or stringer bead from the outside in a girth joint located between adjacent end portions of similar non-rotatable annular work members such as large pipes and the like, by fusing through substantially abutting wall thickness elements of said work members to fill a gap inside said substantially abutting elements, said process comprising, in combination, the steps of:
   a. forming an inner bevel or V-gap surface, an outer gap surface, and an intermediate substantially plane-surfaced land element between said gap surfaces on said of said adjacent end portions,
   b. holding said work member end portions in adjacent positions with said land elements facing each other and substantially in abutment with each other, thereby establishing an internal V-gap and an external gap around the joint between said work members end portions,
   c. advancing a thin metal wire consumable electrode into said outer gap while concurrently traveling said electrode along said gap and during at least part of said traveling directing said wire electrode into said gap with a leading angle of at least 15 degrees with respect to a radius of said work pieces, and
   d. applying an electric arc to said advancing and traveling wire electrode to fuse said wire and concurrently to fuse through said substantially abutting land elements, thereby to fill said inner V-gap with fused weld metal.

2. Process according to claim 1 which includes the further step of stabilizing the inner surface of the weld in said inner gap by placing a heat conductive backing member inside the joint.

3. Process according to claim 2 wherein the backing member comprises copper.

4. Process according to claim 1 which comprises the step of controlling weld penetration at least in part by oscillation of the electrode wire in the external gap.

5. Process according to claim 4 in which amplitude of wire oscillation is varied.

6. Process according to claim 1 in which weld penetration is controlled in part at least by application of gas pressure to molten metal at the arc.

7. Process according to claim 1 in which a combination of oscillation amplitude control and gas pressure is employed to assist in control of weld penetration.

8. Process according to claim 7 in which a backing member is employed within the joint to stabilize the inner surface of the weld.

9. Process according to claim 1 which includes formation within the ends of the work pieces of an internal taper to further control penetration.

10. Process according to claim 9 in which a small rib or feather edge is produced along with the taper to insure fusion at the base of the inner V-gap.

11. Process according to claim 9 in which a flat backing member is used and the internal taper is dimensioned to space the gap from said backing member.

12. Process according to claim 1 in which the wire is oscillated in the external gap and wherein contact tube to work distance is varied to control penetration at various points around the work periphery.

13. Process according to claim 1 which comprises the step of cold-rolling a low internal taper is into the interior pipe end adjacent to the interior bevel with concurrent formation of a small rib or feather edge to assist in stabilizing the metal forming the internal weld bead.

14. A process according to claim 13 which includes the step of maintaining close uniform voltage control at the arc throughout the welding pass.

15. A process according to claim 1 which includes the step of using a back-up inside the work to stabilize the filled inner V-gap bead, the step of oscillating the electrode wire as it is fed into the arc from the exterior of the work, and the step of varying the CTWD at different points around the joint where gravitational effects vary to control penetration.

16. A process according to claim 15 which includes the further steps of forming a low taper inside the work adjacent the internal bevel.

17. A process according to claim 15 which includes the following additional steps:
 a. Programming the CTWD mechanically to change it at various points around the work periphery, to stabilize penetration;
 b. Controlling the gas flow to stabilize the molten metal pool at the arc against the force of gravity.

18. A process according to claim 17 which includes the further step of preparing the joint surfaces with accuracy in the field, thereby to present clean surfaces readily wettable by the molten weld metal.

19. A process according to claim 15 which includes the further step of using an intermittent arc.

20. A process according to claim 1 in which the weld penetation is controlled at least in part by oscillating the electrode wire in the outer gap, performing said oscillation about a pivot joint close to the joint, and varying the amplitude of said oscillation as required for penetration stability.

* * * * *